US010235249B1

(12) United States Patent
Natanzon et al.

(10) Patent No.: US 10,235,249 B1
(45) Date of Patent: Mar. 19, 2019

(54) SYSTEM AND METHOD FOR PAAS REPLICATION (71) Applicant: EMC IP Holding Company, LLC, Hopkinton, MA (US)

(72) Inventors: Assaf Natanzon, Tel Aviv (IL); Brian Lake, Edmonton (CA); Cody Garvin, Atlanta, GA (US); Yossef Saad, Gannei Tikva (IL)

(73) Assignee: EMC IP Holding Company LLC, Hopkinton, MA (US)

(*) Notice: Subject to any disclaimer, the term of this patent is extended or adjusted under 35 U.S.C. 154(b) by 208 days.

(21) Appl. No.: 15/200,805

(22) Filed: Jul. 1, 2016

(51) Int. Cl.
G06F 3/06 (2006.01)
G06F 11/14 (2006.01)
G06F 11/20 (2006.01)

(52) U.S. Cl.
CPC .......... G06F 11/1458 (2013.01); G06F 3/065 (2013.01); G06F 3/0619 (2013.01); G06F 3/0665 (2013.01); G06F 11/1428 (2013.01); G06F 11/1438 (2013.01); G06F 11/1451 (2013.01); G06F 11/1464 (2013.01); G06F 11/2023 (2013.01); G06F 11/2028 (2013.01); G06F 11/2082 (2013.01); G06F 2201/84 (2013.01)

(58) Field of Classification Search
CPC .............. G06F 11/1438; G06F 11/1451; G06F 11/1464; G06F 3/0619; G06F 3/065; G06F 3/0665; G06F 11/1428; G06F 11/1458; G06F 11/2023; G06F 11/2028; G06F 11/2082
See application file for complete search history.

(56) References Cited

U.S. PATENT DOCUMENTS

| | | | | | |
|---|---|---|---|---|---|
| 5,418,966 | A | * | 5/1995 | Madduri | G06F 3/1454 710/200 |
| 5,689,706 | A | * | 11/1997 | Rao | G06F 9/52 |
| 6,128,717 | A | * | 10/2000 | Harrison | G06F 3/0608 710/11 |
| 6,694,447 | B1 | * | 2/2004 | Leach | G06F 11/2038 707/999.202 |
| 8,527,454 | B2 | * | 9/2013 | Oza | G06F 9/526 707/610 |
| 9,055,067 | B1 | * | 6/2015 | Ward, Jr. | H04L 67/10 |
| 9,274,903 | B1 | * | 3/2016 | Garlapati | G06F 11/2002 |
| 9,350,682 | B1 | * | 5/2016 | Gupta | G06F 9/45558 |
| 9,723,064 | B1 | * | 8/2017 | McKelvie | H04L 67/10 |
| 2008/0288811 | A1 | * | 11/2008 | Sudhakar | G06F 17/30067 714/4.11 |
| 2009/0049054 | A1 | * | 2/2009 | Wong | G06F 11/2097 |
| 2010/0082540 | A1 | * | 4/2010 | Isaacson | G06F 11/2097 707/624 |
| 2010/0191884 | A1 | * | 7/2010 | Holenstein | G06F 11/2094 710/200 |
| 2011/0137879 | A1 | * | 6/2011 | Dubey | G06F 17/30171 707/704 |

(Continued)

Primary Examiner — Paul Contino
(74) Attorney, Agent, or Firm — Brian J. Colandreo; Mark H. Whittenberger; Holland & Knight LLP (57) ABSTRACT A method, computer program product, and computing system for defining a group of availability zones within a Platform-as-a-Service environment. A user is allowed to define a level of availability for the Platform-as-a-Service environment by selecting a plurality of availability zones from the group of availability zones.

12 Claims, 3 Drawing Sheets (56) References Cited

U.S. PATENT DOCUMENTS

| | | | |
|---|---|---|---|
| 2014/0082301 A1* | 3/2014 | Barton | G06F 17/30575 711/153 |
| 2014/0101099 A1* | 4/2014 | Driesen | G06F 17/30578 707/610 |
| 2014/0123135 A1* | 5/2014 | Huang | H04L 41/5054 718/1 |
| 2014/0173185 A1* | 6/2014 | Belluonnini | G06F 11/1415 711/103 |
| 2014/0201642 A1* | 7/2014 | Vicat-Blanc | H04L 41/22 715/736 |
| 2016/0077936 A1* | 3/2016 | Tang | G06F 11/2028 714/4.11 |
| 2017/0163475 A1* | 6/2017 | Olson | H04L 41/0668 |
| 2017/0192889 A1* | 7/2017 | Sato | G06F 12/0811 |

\* cited by examiner

SYSTEM AND METHOD FOR PAAS REPLICATION

TECHNICAL FIELD

This disclosure relates to storage systems and, more particularly, to systems and methods for replicating data on storage systems.

BACKGROUND

Storing and safeguarding electronic content is of paramount importance in modern business. Accordingly, various systems may be employed to protect such electronic content.

The use of redundant high-availability data servers is increasing in popularity. Such redundant data servers may be positioned in multiple locations to reduce the likelihood of data unavailability due to e.g., a natural disaster, a network outage, or a server outage.

SUMMARY OF DISCLOSURE

In one implementation, a computer-implemented method is executed on a computing device and includes defining a group of availability zones within a Platform-as-a-Service environment. A user is allowed to define a level of availability for the Platform-as-a-Service environment by selecting a plurality of availability zones from the group of availability zones.

One or more of the following features may be included. Each availability zone may correspond to a data site that provides one or more backend services and includes a frontend volume presentation and a backend data volume. An IO request to one of the frontend volume presentations defined within one of the availability zones may be intercepted. The IO request may be processed on one or more of the backend data volumes defined within one or more of the availability zones. The plurality of availability zones may be monitored to detect the failure of one or more of the plurality of availability zones, thus identifying one or more failed availability zones and one or more operational availability zones. In the event that a failure is detected, any microservices that were associated with the backend services running on the one or more failed availability zones may be restarted so that they are associated with backend services running on the one or more operational availability zones. The IO request may be a data read request that concerns a previously-stored data portion. Processing the IO request on one or more of the backend data volumes may include obtaining the previously-stored data portion from one of the backend data volumes defined within one of the availability zones. The IO request may be a data write request that concerns a to-be-stored data portion and processing the IO request on one or more of the backend data volumes may include locking all of the backend data volumes defined within all of the availability zones and writing the to-be-stored data portion to one of the backend data volumes defined within one of the availability zones. Processing the IO request on one or more of the backend data volumes may include replicating the to-be-stored data portion across all of the backend data volumes defined within all of the availability zones and unlocking all of the backend data volumes defined within all of the availability zones.

In another implementation, a computer program product resides on a computer readable medium and has a plurality of instructions stored on it. When executed by a processor, the instructions cause the processor to perform operations including defining a group of availability zones within a Platform-as-a-Service environment. A user is allowed to define a level of availability for the Platform-as-a-Service environment by selecting a plurality of availability zones from the group of availability zones.

One or more of the following features may be included. Each availability zone may correspond to a data site that provides one or more backend services and includes a frontend volume presentation and a backend data volume. An IO request to one of the frontend volume presentations defined within one of the availability zones may be intercepted. The IO request may be processed on one or more of the backend data volumes defined within one or more of the availability zones. The plurality of availability zones may be monitored to detect the failure of one or more of the plurality of availability zones, thus identifying one or more failed availability zones and one or more operational availability zones. In the event that a failure is detected, any microservices that were associated with the backend services running on the one or more failed availability zones may be restarted so that they are associated with backend services running on the one or more operational availability zones. The IO request may be a data read request that concerns a previously-stored data portion. Processing the IO request on one or more of the backend data volumes may include obtaining the previously-stored data portion from one of the backend data volumes defined within one of the availability zones. The IO request may be a data write request that concerns a to-be-stored data portion and processing the IO request on one or more of the backend data volumes may include locking all of the backend data volumes defined within all of the availability zones and writing the to-be-stored data portion to one of the backend data volumes defined within one of the availability zones. Processing the IO request on one or more of the backend data volumes may include replicating the to-be-stored data portion across all of the backend data volumes defined within all of the availability zones and unlocking all of the backend data volumes defined within all of the availability zones.

In another implementation, a computing system including a processor and memory is configured to perform operations including defining a group of availability zones within a Platform-as-a-Service environment. A user is allowed to define a level of availability for the Platform-as-a-Service environment by selecting a plurality of availability zones from the group of availability zones.

One or more of the following features may be included. Each availability zone may correspond to a data site that provides one or more backend services and includes a frontend volume presentation and a backend data volume. An IO request to one of the frontend volume presentations defined within one of the availability zones may be intercepted. The IO request may be processed on one or more of the backend data volumes defined within one or more of the availability zones. The plurality of availability zones may be monitored to detect the failure of one or more of the plurality of availability zones, thus identifying one or more failed availability zones and one or more operational availability zones. In the event that a failure is detected, any microservices that were associated with the backend services running on the one or more failed availability zones may be restarted so that they are associated with backend services running on the one or more operational availability zones. The IO request may be a data read request that concerns a previously-stored data portion. Processing the IO request on one or more of the backend data volumes may include obtaining the previously-stored data portion from one of the backend data volumes defined within one of the availability zones. The IO request may be a data write request that concerns a to-be-stored data portion and processing the IO request on one or more of the backend data volumes may include locking all of the backend data volumes defined within all of the availability zones and writing the to-be-stored data portion to one of the backend data volumes defined within one of the availability zones. Processing the IO request on one or more of the backend data volumes may include replicating the to-be-stored data portion across all of the backend data volumes defined within all of the availability zones and unlocking all of the backend data volumes defined within all of the availability zones.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
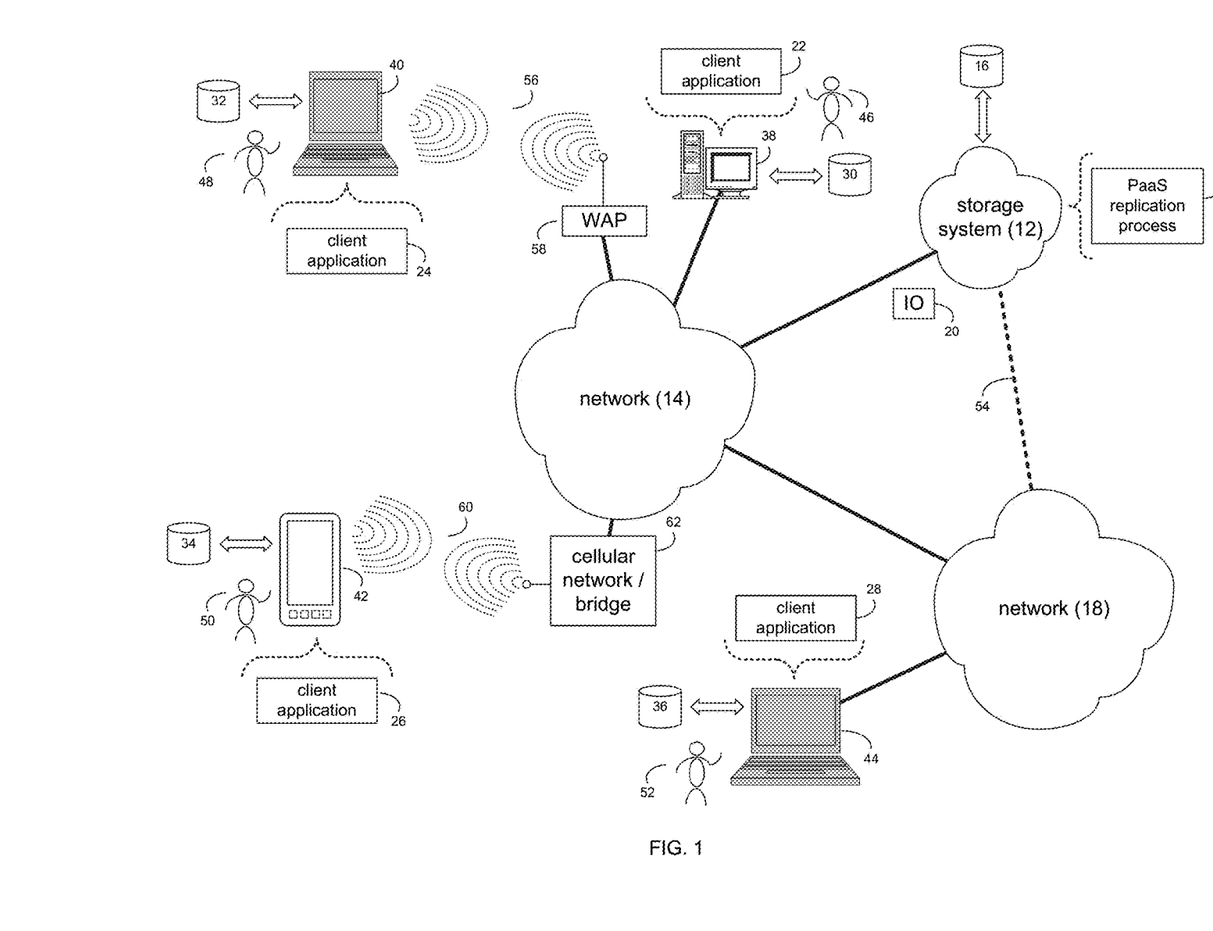
FIG. 1 is a diagrammatic view of a storage system and a PaaS replication process coupled to a distributed computing network.

System Overview:

Referring to FIG. 1, there is shown PaaS replication process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, a series of server computers with a memory system, and a cloud-based device with a memory system.

As is known in the art, a SAN may include one or more of a personal computer, a server computer, a series of server computers, a mini computer, or a mainframe computer. Storage system 12 may be configured as an active-active storage system or an active-passive storage system, wherein storage system 12 may include two or more storage arrays that may be coupled via a communication link, wherein any logical units/data is fully synchronized between the storage arrays.

The various components of storage system 12 may execute one or more operating systems, examples of which may include but are not limited to: Microsoft Windows™; Linux™, Unix, or a custom operating system, for example.

The instruction sets and subroutines of PaaS replication process 10, which may be stored on storage device 16 included within storage system 12, may be executed by one or more processors (not shown) and one or more memory architectures (not shown) included within storage system 12. Storage device 16 may include but is not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a personal digital assistant (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smart phone 42 and cellular network/bridge 62, which is shown directly coupled to network 14.

Client electronic devices 38, 40, 42, 44 may each execute an operating system, examples of which may include but are not limited to Microsoft Windows™, Linux™, or a custom operating system.

For illustrative purposes, storage system 12 will be described as being a network-based storage system that includes a plurality of server computers. However, this is for illustrative purposes only and is not intended to be a limitation of this disclosure, as other configurations are possible and are considered to be within the scope of this disclosure.

Figure 2:
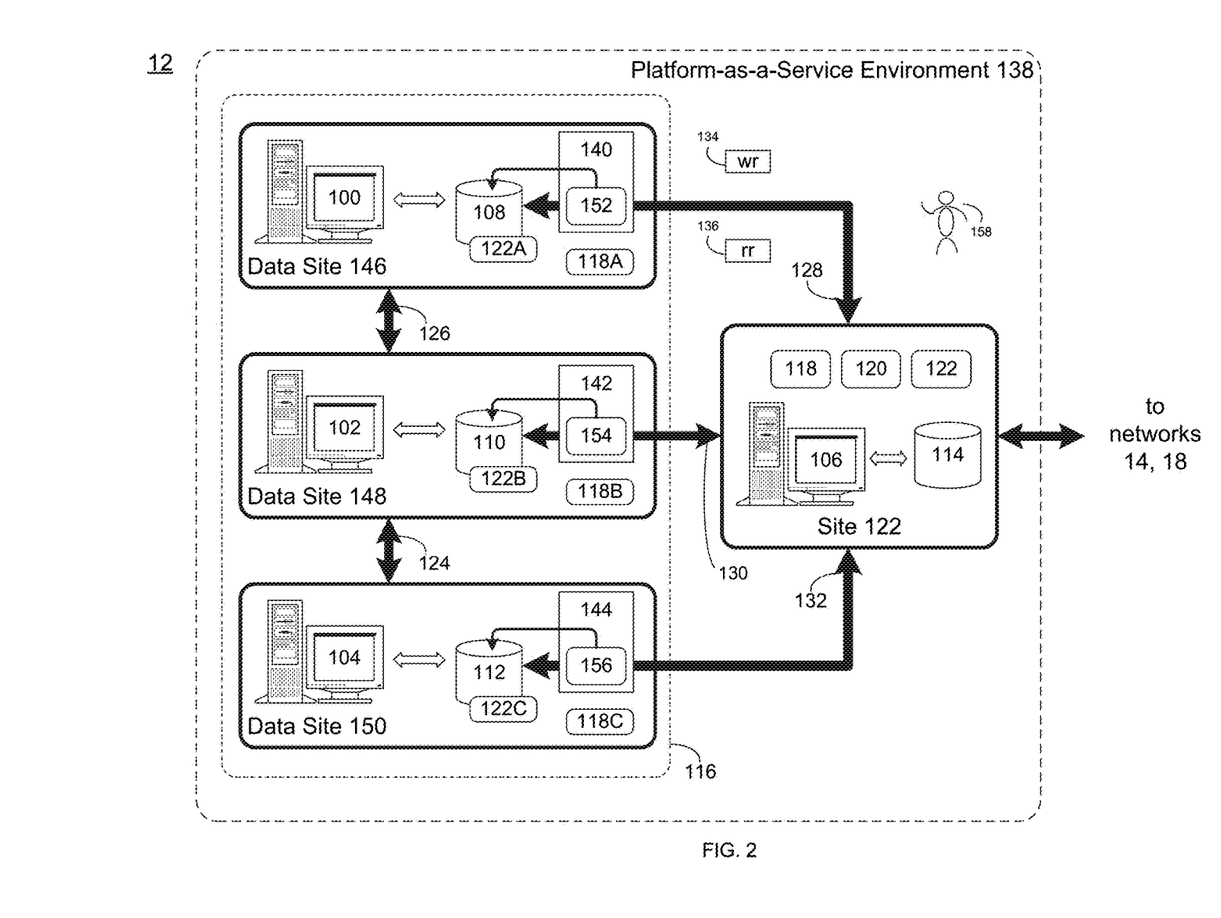
FIG. 2 is a flow chart of one implementation of the PaaS replication process of FIG. 1.

Referring also to FIG. 2, there is shown one manner in which storage system 12 may be configured. In this implementation, storage system 12 may include two or more data servers (e.g., data servers 100, 102, 104) that may be coupled to one or more application servers (e.g., application server 106). Data server 100 may be coupled to storage device 108, which may be used to store content associated with data server 100; data server 102 may be coupled to storage device 110, which may be used to store content associated with data server 102; data server 104 may be coupled to storage device 112, which may be used to store content associated with data server 112; and application server 106 may be coupled to storage device 114, which may be used to store content associated with application server 106. Data servers 100, 102, 104 may collectively form data array 116.

Examples of storage devices 108, 110, 112, 114 may include but is not limited to: a hard disk drive; a RAID device; a random access memory (RAM); a read-only memory (ROM); and all forms of flash memory storage devices. An example of data servers 100, 102, 104 may include but are not limited to a storage array/device that may be configured in active-active or active-passive configuration. An example of application server 106 may include but is not limited to a computing system configured to act as a gateway to PaaS 138 that may allow e.g., users 46, 48, 50, 52 to deploy PaaS-based microservices (e.g., microservices 118, 120), wherein content (e.g., content 122) generated for these users (e.g., users 46, 48, 50, 52) by these microservices (e.g., microservices 118, 120) may be stored within data array 116. Examples of microservices (e.g., microservices 118, 120) may include but are not limited to SQL databases services (e.g., Oracle™), non-SQL database services (e.g., Cassandra™ and Mongo™), object storage services (e.g., S3™) and message queues services (RabbitMQ™)

Data servers 100, 102, 104 and/or application server 106 may include one or more backend devices that may be configured to define and expose one or more logical units (e.g., logical drives) that users of data servers 100, 102, 104 and/or application server 106 may use and access to store data.

While in this particular example, data servers 100, 102, 104 and application server 106 are shown to include a single storage device (e.g., storage devices 108, 110, 112, 114 respectively), this is for illustrative purposes only and is not intended to be a limitation of this disclosure. Specifically, the actual number of storage devices may be increased or decreased depending upon e.g. the level of redundancy/performance/capacity required. Further, these storage devices (e.g., storage devices 108, 110, 112, 114) may be configured as a RAID array, examples of which may include but are not limited to RAID 0, RAID 1, RAID 3, RAID 4, RAID 5, RAID 6, and RAID 7. Additionally, these storage devices (e.g., storage devices 108, 110, 112, 114) may include individual "hot-swappable" hard disk drives, wherein these storage devices may be included in e.g., an NAS device or as a portion of a SAN.

The various servers (e.g., data servers 100, 102, 104 and application server 106) may execute all or a portion of PaaS replication process 10. The instruction sets and subroutines of PaaS replication process 10, which may be stored on the storage devices (e.g., storage devices 108, 110, 112, 114) coupled to e.g., data servers 100, 102, 104 and application server 106, may be executed by one or more processors (not shown) and one or more memory architectures (not shown) included within e.g., data servers 100, 102, 104 and application server 106.

Data servers 100, 102, 104 may be coupled to each other via e.g., communication links 124, 126. Data servers 100, 102, 104 may be configured in a mirrored configuration, wherein any data written to one of the data servers is "mirrored" onto the other data servers.

While storage system 12 and data array 116 are described above as including three data servers (e.g., data servers 100, 102, 104), this is for illustrative purposes only and is not intended to be a limitation of this disclosure, as other configurations are possible. Further, while storage system 12 is described above as including one application server (e.g., application server 106), this is for illustrative purposes only and is not intended to be a limitation of this disclosure, as other configurations are possible.

The data servers (e.g., data servers 100, 102, 104) may be coupled to the application server (e.g., application server 106) using various communication links. For example, communication link 128 may be configured to couple data server 100 and application server 106; communication link 130 may be configured to couple data server 102 and application server 106; and communication link 132 may be configured to couple data server 104 and application server 106.

As discussed above, various IO requests (e.g. IO request 20) may be generated. For example, these IO requests (e.g. IO request 20) may be internally generated within application server 106. Examples of IO request 20 may include but are not limited to data write request 134 (i.e. a request that content 122 be written to data array 116) and data read request 136 (i.e. a request that content 122 be read from data array 116).

Assume for the following example that some or all of storage system 12 is configured as a Platform-as-a-Service environment (e.g., PaaS 138). As is known in the art, a Platform-as-a-Service environment may be defined as a category of cloud computing services that provides a platform that allows customers to develop, run and manage Web applications without the complexity of building and maintaining the infrastructure typically associated with the developing and launching of an application. PaaS 138 may be delivered in various ways: a) as a public cloud service from a provider (where the consumer controls software deployment and configuration settings, and the provider provides the networks, servers, storage and other services to host the consumer's application), and b) as software installed in private data centers (or public infrastructure) as a service, wherein this software is managed by internal IT departments.

PaaS 138 may provide a new method for development, thus allowing much faster application development and allowing development of ultra-scalable applications that may serve millions of users in a very agile way. Accordingly, PaaS 138 may simplify portions of items that the user has to manage, and may allow the user to only worry about data and applications. One example of PaaS 138 is Cloud-Foundry™, which is developed and maintained as open source by the EMC Federation™.

PaaS 138 may provide and support all the underlying computing hardware and software; thus allowing users (e.g., users 46, 48, 50, 52) to simply log in to PaaS 138 (e.g., using client applications 22, 24, 26, 28 respectively) and start using PaaS 138.

In order to provide a level of redundancy and high-availability to the microservices (e.g., microservices 118, 120) offered by PaaS 138, as well as the content (e.g., content 122) generated within PaaS 138, these microservices (e.g., microservices 118, 120) and the data (e.g., content 122) may be maintained in a redundant and highly-available fashion within data array 116.

Figure 3:
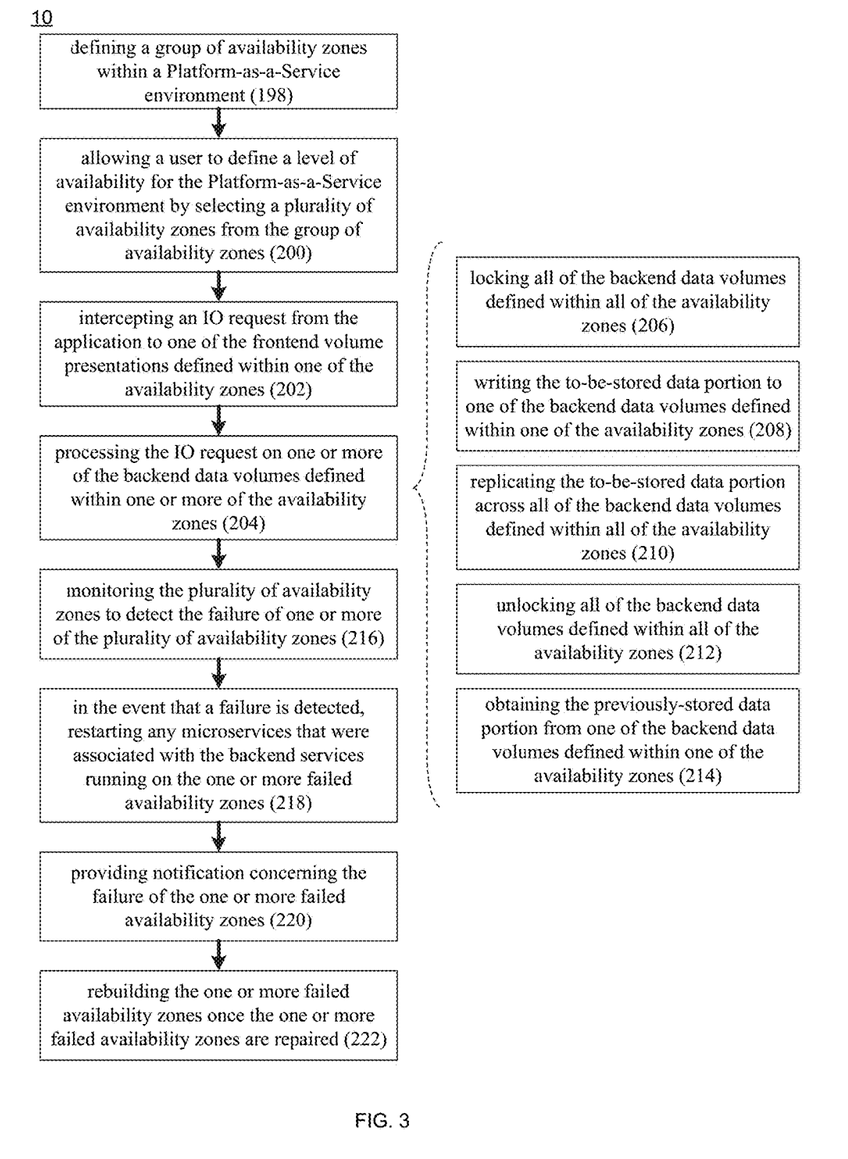
FIG. 3 is a diagrammatic view of the storage system of FIG. 1.

The PaaS Replication Process:

Referring also to FIG. 3, PaaS replication process 10 may define 198 a group of availability zones (e.g., availability zones 140, 142, 144) within PaaS 138. For example and when configuring PaaS 138, administrator 158 of PaaS 138 may define availability zones 140, 142, 144 within PaaS 138 in order to offer the users (e.g., users 46, 48, 50, 52) of PaaS 138 various options concerning the level of redundancy/ high-availably afforded to the microservices (e.g., microservices 118, 120) deployed within PaaS 138 and the data (e.g., content 122) stored within PaaS 138.

Accordingly and when designing/configuring PaaS 138, by defining 198 a group of availability zones (e.g., availability zones 140, 142, 144), users (e.g., users 46, 48, 50, 52) of PaaS 138 may select different levels of redundancy/high-availably concerning their microservices (e.g., microservices 118, 120) and their data (e.g., content 122), wherein the appropriate level of redundancy/high-availably may be based upon e.g., the IT budget of the user, the value that the user places on the data, and/or the need/desire of the user to have the data consistently available.

PaaS replication process 10 may allow 200 a user (e.g., user 46) to define a level of availability (in this illustrative example, a) no-level, b) mid-level, or c) high-level) for the Platform-as-a-Service environment (e.g., PaaS 138) by selecting a plurality of availability zones from the group of availability zones (e.g., availability zones 140, 142, 144).

For example, if user 46 does not need any redundancy/high-availably concerning microservices 118, 120 and content 122, user 46 may select a single availability zone (e.g., availability zone 140). With such a system, microservices 118, 120 and content 122 may be unavailable in the event of a failure of a single availability zone (e.g., availability zone 140).

However, if user 46 wants a mid-level of redundancy/high-availably concerning microservices 118, 120 and content 122, user 46 may select two availability zones (e.g., availability zones 140, 142). With such a system, microservices 118, 120 and content 122 will be available even after the failure of one of these availability zones and will only be unavailable after the failure of both of the availability zones (e.g., availability zone 140, 142).

Further, if user 46 wants a high-level of redundancy/high-availably concerning microservices 118, 120 and content 122, user 46 may select all three availability zones (e.g., availability zones 140, 142, 144). With such a system, microservices 118, 120 and content 122 will be available even after the failure of two of these availability zones and will only be unavailable after the failure of all three of the availability zones (e.g., availability zone 140, 142, 144).

Assume for this example that PaaS 138 defines 198 three availability zones (e.g., availability zones 140, 142, 144) and that e.g., user 46 selects 200 all three availability zones (e.g., availability zones 140, 142, 144), as they want a high-level of availability.

Each of availability zones 140, 142, 144 may be associated with a different data site. For example, availability zone 140 may be associated with data site 146; availability zone 142 may be associated with data site 148; and availability zone 144 may be associated with data site 150.

Data sites 146, 148, 150 may be positioned in geographically disparate locations. For example, if data site 146 is located in an area that is routinely subjected to hurricanes, data site 148 and/or data site 150 may be positioned outside of the hurricane zone. Each of these availability zone (e.g., availability zones 140, 142, 144) may include a frontend volume presentation and a backend data volume.

For example, availability zone 140 may include frontend volume presentation 152, wherein frontend volume presentation 152 may be presented to (in this example) microservice 118 as a target for data reads/writes and may be associated with a backend data volume (e.g., all or a portion of storage device 108). Accordingly, data to be read from/written to frontend volume presentation 152 may be read from/written to storage device 108.

Additionally, availability zone 142 may include frontend volume presentation 154, wherein frontend volume presentation 154 may be presented to (in this example) microservice 118 as a target for data reads/writes and may be associated with a backend data volume (e.g., all or a portion of storage device 110). Accordingly, data to be read from/written to frontend volume presentation 154 may be read from/written to storage device 110.

Further, availability zone 144 may include frontend volume presentation 156, wherein frontend volume presentation 156 may be presented to (in this example) microservice 118 as a target for data reads/writes and may be associated with a backend data volume (e.g., all or a portion of storage device 112). Accordingly, data to be read from/written to frontend volume presentation 156 may be read from/written to storage device 112.

As discussed above, during use of e.g., microservice 118 deployed by e.g., one or more of users 46, 48, 50, 52, content (e.g., content 122) may be generated which may be stored within data array 116. Additionally and during operation of e.g., microservice 118, content (e.g., content 122) may be retrieved from data array 116. Accordingly, microservice 118 may generate write request 134 and/or read request 136, which may be processed by data array 116.

Typically, when a user (e.g., user 46) deploys a microservice (e.g., microservice 118) within PaaS 138, that microservice may associate with one data site (e.g., data site 146) and a corresponding e.g., backend service 118A. Accordingly, a microservice (e.g., microservice 118) within PaaS 138 may typically write data to only one data server/storage device (e.g., data server 100/storage device 108). Therefore, write request 134 and/or read request 136 may only be provided to one data site (e.g., data site 146).

Since the user (e.g., user 46) of PaaS 138 decided that they want PaaS 138 to provide a high-level of availability, they chose to utilize e.g., all three availability zones (e.g., availability zones 140, 142, 144) defined within PaaS 138. Accordingly, PaaS replication process 10 may intercept 202 an IO request (e.g., write request 134 and/or read request 136) from the microservice (e.g., microservice 118) to one of the frontend volume presentations (e.g., frontend presentation volumes 152, 154, 156) defined within one of the availability zones (e.g., availability zones 140, 142, 144) and may process 204 the IO request on one or more of the backend data volumes (e.g., storage devices 108, 110, 112) defined within one or more of the availability zones (e.g., availability zones 140, 142, 144).

For example, assume that the above-referenced IO request is a data write request (e.g., write request 134) that concerns a to-be-stored data portion (e.g., content 122). Further assume that (in this example) microservice 118 is associated with data site 146 and backend service 118A. Accordingly, PaaS replication process 10 may intercept 202 write request 134 from microservice 118 that was destined for frontend volume presentation 152 defined within availability zone 140 and may process 204 write request 134.

When processing 204 the IO request (e.g., write request 134) on one or more of the backend data volumes, PaaS replication process 10 may lock 206 all of the backend data volumes (e.g., storage devices 108, 110, 112) defined within all of the availability zones (e.g., availability zones 140, 142, 144) and may write 208 the to-be-stored data portion (content 122) to the backend data volume (e.g., storage devices 108) associated with frontend volume presentation 152 and defined within availability zone 140), resulting in content 122A being stored within storage device 108.

Once writing 208 is complete, PaaS replication process 10 may replicate 210 the to-be-stored data portion (e.g., content 122) across all of the backend data volumes (e.g., storage devices 108, 110, 112) defined within all of the availability zones (e.g., availability zones 140, 142, 144), thus resulting in a copy of content 122 being written to each of storage device 108 (as content 122A), storage device 110 (as content 122B) and storage device 112 (as content 122C). Once replication 210 is complete, PaaS replication process 10 may unlock 212 all of the backend data volumes (e.g., storage devices 108, 110, 112) defined within all of the availability zones (e.g., availability zones 140, 142, 144) so that e.g., other IO requests may be processed.

As a further example, assume that the above-referenced IO request is a data read request (e.g., read request 136) that concerns a previously-stored data portion (e.g., content 122A, 122B, 122C). Again and continuing with the example in which microservice 118 is associated with one data site (e.g., data site 146) and backend service 118A, PaaS replication process 10 may intercept 202 read request 136 from microservice 118 that was destined for frontend volume presentation 152 defined within availability zones 140 and may process 204 read request 136. When processing 204 the IO request (e.g., read request 136) on one or more of the backend data volumes, PaaS replication process 10 may obtain 214 the previously-stored data portion from one of the backend data volumes (e.g., storage devices 108, 110, 112) defined within one of the availability zones (e.g., availability zones 140, 142, 144). Since, in this example, read request 136 was destined for data site 146, content 122A may be obtained 214 from storage device 108. However, as content 122 was replicated 210 across storage devices 108, 110, 112, content 122 may be obtained 214 from any of storage devices 108, 110, 112. Specifically, content 122A may be obtained 214 from storage device 108; content 122B may be obtained 214 from storage device 110; and content 122C may be obtained 214 from storage device 112.

As discussed above, the plurality of availability zones (e.g., availability zones 140, 142, 144) may be configured in an active-active configuration and/or an active-passive configuration. For example and assuming that data site 146 is the active data site, data sites 148, 150 may be configured in a passive configuration, wherein data sites 148, 150 are in a "standby mode" as long as data site 146 is functioning properly. Conversely, data sites 148, 150 may be configured in an active configuration, wherein data sites 148, 150 are always in active mode (i.e., fully operational, providing backend services and processing IO requests) regardless of whether data site 146 is functioning properly.

PaaS replication process 10 may monitor 216 the plurality of availability zones (e.g., availability zones 140, 142, 144) to detect the failure of one or more of the plurality of availability zones (e.g., availability zones 140, 142, 144), thus identifying one or more failed availability zones and one or more operational availability zones.

For example, assume that data site 146 is offline (e.g., due to a power outage taking down data site 146). PaaS replication process 10 may monitor 216 availability zones 140, 142, 144 to detect any failures and identify availability zone 140 as a failed availability zone and availability zones 142, 144 as operational availability zones.

Accordingly and due to the above-described level of high-availability selected by the user (e.g., user 46) of PaaS 138, PaaS replication process 10 may continue normal operation of PaaS 138 using the one or more operational availability zones (e.g., availability zones 142, 144). This continued normal operation may be accomplished by PaaS replication process 10 restarting 218 (in the event that a failure is detected) any microservices (e.g., microservice 118) that were associated with a failed availability zone (e.g., failed availability zone 140) so that they are associated with one or more operational availability zones (e.g., operational availability zones 142, 144). As discussed above, the plurality of availability zones (e.g., availability zones 140, 142, 144) may be configured in an active-active configuration and/or an active-passive configuration. Accordingly, backend service 118A will also be available (in this example) on operational availability zone 142 (as backend service 118B) and on operational availability zone 144 (as backend service 118C). Accordingly and in the event that (as discussed above) availability zone 140 becomes unavailable, continued normal operation of PaaS 138 may be accomplished by PaaS replication process 10 restarting 218 microservice 118 (which was associated with failed availability zone 140) so that it is associated with e.g., operational availability zone 142 (and backend service 118B) or operational availability zone 144 (and backend service 118C). Further, PaaS replication process 10 may provide 220 notification (e.g., to an administrator and/or user of PaaS 138) concerning the failure of the one or more failed availability zones (e.g., availability zone 140).

Assuming that data site 146 becomes operational after the above-described power outage is rectified, PaaS replication process 10 may rebuild 222 the one or more failed availability zones (e.g., availability zone 140) once the one or more failed availability zones are repaired. When rebuilding 222 availability zone 140, data from e.g., storage device 110 (associated with availability zone 142) and/or data from e.g., storage device 112 (associated with availability zone 144) may be copied to storage device 108 using e.g., a procedure to repair a "broken mirror". Additionally, backend service 118A may be restarted.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    defining a group of availability zones within a Platform-as-a-Service environment;
    allowing a user to define a level of availability for the Platform-as-a-Service environment by selecting a plurality of availability zones from the group of availability zones, wherein each availability zone corresponds to a data site that provides one or more backend services and includes a frontend volume presentation and a backend data volume;
    deploying a microservice within the Platform-as-a-Service environment;
    associating the deployed microservice with one of the availability zones selected by the user and a backend service provided by that respective availability zone, wherein the backend service is a redundant microservice;

interceptingan IO request to one of the frontend volume presentations defined within one of the availability zones; and processing the IO request on one or more of the backend data volumes defined within the plurality of availability zones selected by the user, wherein the IO request is a data write request that concerns a to-be-stored data portion and processing the IO request on one or more of the backend data volumes includes:

locking all of the backend data volumes defined within all of the availability zones;

writing the to-be-stored data portion to one of the backend data volumes defined within one of the availability zones;

replicating the to-be-stored data portion across all of the backend data volumes defined within all of the availability zones; and unlocking all of the backend data volumes defined within all of the availability zones.

2. The computer-implemented method of claim 1 further comprising:

monitoring the plurality of availability zones to detect the failure of one or more of the plurality of availability zones, thus identifying one or more failed availability zones and one or more operational availability zones.

3. The computer-implemented method of claim 2 further comprising:

in the event that a failure is detected, restarting any microservices that were associated with the backend services running on the one or more failed availability zones so that they are associated with backend services running on the one or more operational availability zones.

4. The computer-implemented method of claim 1 wherein the IO request is a data read request that concerns a previously-stored data portion and processing the IO request on one or more of the backend data volumes includes:

obtaining the previously-stored data portion from one of the backend data volumes defined within one of the availability zones.

5. A computer program product residing on a non-transitory computer readable medium having a plurality of instructions stored thereon which, when executed by a processor, cause the processor to perform operations comprising:

defining a group of availability zones within a Platform-as-a-Service environment;

allowing a user to define a level of availability for the Platform-as-a-Service environment by selecting a plurality of availability zones from the group of availability zones, wherein each availability zone corresponds to a data site that provides one or more backend services and includes a frontend volume presentation and a backend data volume;

deploying a microservice within the Platform-as-a-Service environment;

associating the deployed microservice with one of the availability zones selected by the user and a backend service provided by that respective availability zone, wherein the backend service is a redundant microservice;

intercepting an IO request to one of the frontend volume presentations defined within one of the availability zones; and processing the IO request on one or more of the backend data volumes defined within the plurality of availability zones selected by the user, wherein the IO request is a data write request that concerns a to-be-stored data portion and processing the IO request on one or more of the backend data volumes includes:

locking all of the backend data volumes defined within all of the availability zones;

writing the to-be-stored data portion to one of the backend data volumes defined within one of the availability zones;

replicating the to-be-stored data portion across all of the backend data volumes defined within all of the availability zones; and unlocking all of the backend data volumes defined within all of the availability zones.

6. The computer program product of claim 5 further comprising instructions for:

monitoring the plurality of availability zones to detect the failure of one or more of the plurality of availability zones, thus identifying one or more failed availability zones and one or more operational availability zones.

7. The computer program product of claim 6 further comprising instructions for:

in the event that a failure is detected, restarting any microservices that were associated with the backend services running on the one or more failed availability zones so that they are associated with backend services running on the one or more operational availability zones.

8. The computer program product of claim 5 wherein the IO request is a data read request that concerns a previously-stored data portion and processing the IO request on one or more of the backend data volumes includes:

obtaining the previously-stored data portion from one of the backend data volumes defined within one of the availability zones.

9. A computing system including a processor and memory configured to perform operations comprising:

defining a group of availability zones within a Platform-as-a-Service environment;

allowing a user to define a level of availability for the Platform-as-a-Service environment by selecting a plurality of availability zones from the group of availability zones, wherein each availability zone corresponds to a data site that provides one or more backend services and includes a frontend volume presentation and a backend data volume;

deploying a microservice within the Platform-as-a-Service environment;

associating the deployed microservice with one of the availability zones selected by the user and a backend service provided by that respective availability zone, wherein the backend service is a redundant microservice;

intercepting an IO request to one of the frontend volume presentations defined within one of the availability zones; and processing the IO request on one or more of the backend data volumes defined within the plurality of availability zones selected by the user, wherein the IO request is a data write request that concerns a to-be-stored data portion and processing the IO request on one or more of the backend data volumes includes:

locking all of the backend data volumes defined within all of the availability zones;

writing the to-be-stored data portion to one of the backend data volumes defined within one of the availability zones;

replicating the to-be-stored data portion across all of the backend data volumes defined within all of the availability zones; and unlocking all of the backend data volumes defined within all of the availability zones.

10. The computing system of claim 9 further configured to perform operations comprising:

monitoring the plurality of availability zones to detect the failure of one or more of the plurality of availability zones, thus identifying one or more failed availability zones and one or more operational availability zones.

11. The computing system of claim 10 further configured to perform operations comprising:

in the event that a failure is detected, restarting any microservices that were associated with the backend services running on the one or more failed availability zones so that they are associated with backend services running on the one or more operational availability zones.

12. The computing system of claim 9 wherein the IO request is a data read request that concerns a previously-stored data portion and processing the IO request on one or more of the backend data volumes includes:

obtaining the previously-stored data portion from one of the backend data volumes defined within one of the availability zones.

\* \* \* \* \*